(12) United States Patent
Kim et al.

(10) Patent No.: US 7,058,270 B2
(45) Date of Patent: Jun. 6, 2006

(54) METHOD FOR PREPARING PLASTIC OPTICAL FIBER PREFORM

(75) Inventors: Hwa Joong Kim, Seoul (KR); Hae Woog Choi, Bucheon-si (KR); Se Lee Chang, Ansan-si (KR); Dae Sung Lee, Kunpo-si (KR); Jung Hyun Oh, Anyang-si (KR); Eu Gene Kim, Koyang-si (KR)

(73) Assignee: SSCP Co., Ltd. (KR)

( * ) Notice: Subject to any disclaimer, the term of this patent is extended or adjusted under 35 U.S.C. 154(b) by 32 days.

(21) Appl. No.: 10/515,574

(22) PCT Filed: Jun. 27, 2002

(86) PCT No.: PCT/KR02/01225

§ 371 (c)(1),
(2), (4) Date: Nov. 22, 2004

(87) PCT Pub. No.: WO03/098289

PCT Pub. Date: Nov. 27, 2003

(65) Prior Publication Data

US 2005/0180708 A1    Aug. 18, 2005

(30) Foreign Application Priority Data

May 22, 2002    (KR) ................................ 2002-28403

(51) Int. Cl.
*G02B 6/02*    (2006.01)
*G02B 6/28*    (2006.01)

(52) U.S. Cl. ...................... 385/124; 385/127; 264/1.24

(58) Field of Classification Search ................ 385/124, 385/126, 127; 428/542.8; 264/1.24
See application file for complete search history.

(56) References Cited

U.S. PATENT DOCUMENTS

| | | | | |
|---|---|---|---|---|
| 5,235,660 A | * | 8/1993 | Perry et al. .................. | 385/124 |
| 5,851,666 A | * | 12/1998 | Nonaka et al. .............. | 428/380 |
| 5,916,495 A | * | 6/1999 | Nonaka et al. ............. | 264/1.24 |
| 5,916,971 A | * | 6/1999 | Koike et al. ................. | 525/197 |
| 6,086,999 A | * | 7/2000 | Ilvashenko .................. | 428/375 |
| 6,606,448 B1 | * | 8/2003 | Terauchi ....................... | 386/46 |

FOREIGN PATENT DOCUMENTS

KR    2001-0067464    7/2001

\* cited by examiner

*Primary Examiner*—Akm Enayet Ullah
*Assistant Examiner*—Daniel Petkovsek
(74) *Attorney, Agent, or Firm*—Anderson Kill & Olick, P.C.

(57) ABSTRACT

The present invention relates to a method for preparing a GI (graded index) plastic optical fiber preform having a radial refractive index gradient, the refractive index increasing gradually from the outer periphery of the preform toward the center thereof, comprising inserting a 1st plastic tube (inside diameter: $d_1^i$, outside diameter: $d_1^o$) (111) made of a first polymer (refractive index: $n_1$) in a cylinder reactor (inside diameter: $d_0^i$, $d_1^o \leq d_0^i$) and inserting a 2nd plastic tube (inside diameter: $d_2^i$, outside diameter $d_2^o$, $d_2^o \leq d_1^i$) (112) made of a second polymer (refractive index: $n_2$, $n_2 \geq n_1$) in the 1st plastic tube, the reactor, the 1st and 2nd plastic tubes are positioned coaxially, injecting a precursor of a third polymer (refractive index: n', n'≧$n_2$) into the 2nd plastic tube, injecting a precursor of a fourth polymer (refractive index: n", $n_1 \leq n'' \leq n_2$) into the space between the 1st and 2nd plastic tubes.

29 Claims, 4 Drawing Sheets

Step 1     Step 2     Step 3

US 7,058,270 B2

METHOD FOR PREPARING PLASTIC OPTICAL FIBER PREFORM

FIELD OF THE INVENTION

The present invention relates to an improved process for preparing a graded index optical fiber preform having a radial refractive index gradient, the refractive index increasing gradually from the outer periphery toward the center thereof.

BACKGROUND OF THE INVENTION

A plastic optical fiber(POF) made of a plastic core and a plastic cladding has been widely used for short distance optical transmission in which the higher optical loss therethrough as compared with a glass optical fiber does not pose a serious problem, a plastic optical fiber having the advantage that it can generally be produced at a lower cost than a glass optical fiber. Depending on the signal detecting type, plastic optical fiber is classified into single mode optical fiber, multi mode step-index(SI) optical fiber and multi mode graded-index(GI) optical fiber.

A graded index plastic optical fiber(GI POF) has a refractive index distribution which decreases gradually from the center of the optical fiber toward the outer periphery thereof. Due to such refractive index distribution, the light transmission speed at the center thereof is low, and high at the outer periphery, but such difference in the light transmission speed is cancelled out by the fact that the path difference at the outer region is longer than at the center. That is, incident signals can be detected simultaneously without delay. Therefore, a GI POF is suitable for high-speed, high-capacity transmission over a wide bandwidth and for short distance optical transmission.

There have been proposed a number of processes for producing a preform for plastic optical fibers, e.g., continuous and batch extrusion processes, but it is difficult to produce plastic optical fibers having a refractive index gradient by continuous extrusion. Therefore, thermal drawing of a preform is generally used for the production of plastic optical fibers having a refractive index gradient.

The most commonly used method for producing a GI plastic optical fiber is interface gel polymerization, wherein a non-reactive refractive index controlling agent is dispersed in a preform in such a manner that the concentration thereof becomes higher as it goes to the center of the preform, to create a refractive index gradient.

The interface gel polymerization is a simple process for producing a GI plastic optical fiber but it is difficult to control the heat of reaction generated by the bulk polymerization, which results in micro pores. This process is, therefore, not suitable for producing a plastic optical fiber whose diameter is 20 mm or bigger.

Japanese Laid-Open Patent publication No. 07-027928 and No. 08-304634 disclose a GI plastic optical fiber comprising many polymer resin layers having different refractive indices, which includes a core having a decreasing refractive index gradient from the center of the core and a clad coated around the core with a lower refractive index than that of the core. However, such a fiber is produced through a complicated production process and has a difficulty in precisely controlling the refractive index distribution. U.S. Pat. No. 5,639,512, No. 5,916,495 and No. 5,614,253 disclose a process of producing a preform of a GI type optical fiber by injecting a polymeric solution into a rotating tube, or by dipping a polymer rod in a polymeric solution containing a refractive index controlling agent to form a polymer coat on the polymer rod, followed by removing the solvent from the coat. But such a process needs additional equipments and process steps for injecting a solution and removing the solvent, although it has the advantage that the refractive index can be easily controlled by adjusting the amount of the refractive index controlling agent added.

SUMMARY OF THE INVENTION

Therefore, the purpose of the present invention is to provide an improved process for producing a preform of GI type plastic optical fiber having a controlled refractive index gradient.

In accordance with the present invention, there is provided a method for preparing a GI plastic optical fiber preform having a radial refractive index gradient, the refractive index increasing gradually from the outer periphery of the preform toward the center thereof, comprising inserting a 1st plastic tube(inside diameter: $d_1^i$, outside diameter: $d_1^o$)(111) made of a first polymer(refractive index: $n_1$) in a cylindric polymerization reactor(inside diameter: $d_0^i$, $d_1^o \leq d_0^i$), inserting a 2nd plastic tube(inside diameter: $d_2^i$, outside diameter: $d_2^o$, $d_2^o \leq d_1^i$)(112) made of a second polymer(refractive index: $n_2$, $n_2 > n_1$) in the 1st plastic tube, wherein the reactor, the 1st and 2nd plastic tubes are coaxially positioned; injecting a precursor of a third polymer (refractive index: n', $n' > n_2$) into the inner side of the 2nd plastic tube and a precursor of a fourth polymer(refractive index: n", $n_1 < n'' < n_2$) into the space formed between the 1st and 2nd plastic tubes; and polymerizing and curing the precursors to form a core of the preform. The present invention also provides a preform of a GI type plastic optical fiber obtained by the inventive method.

DETAILED DESCRIPTION OF THE INVENTION

Figure 1:
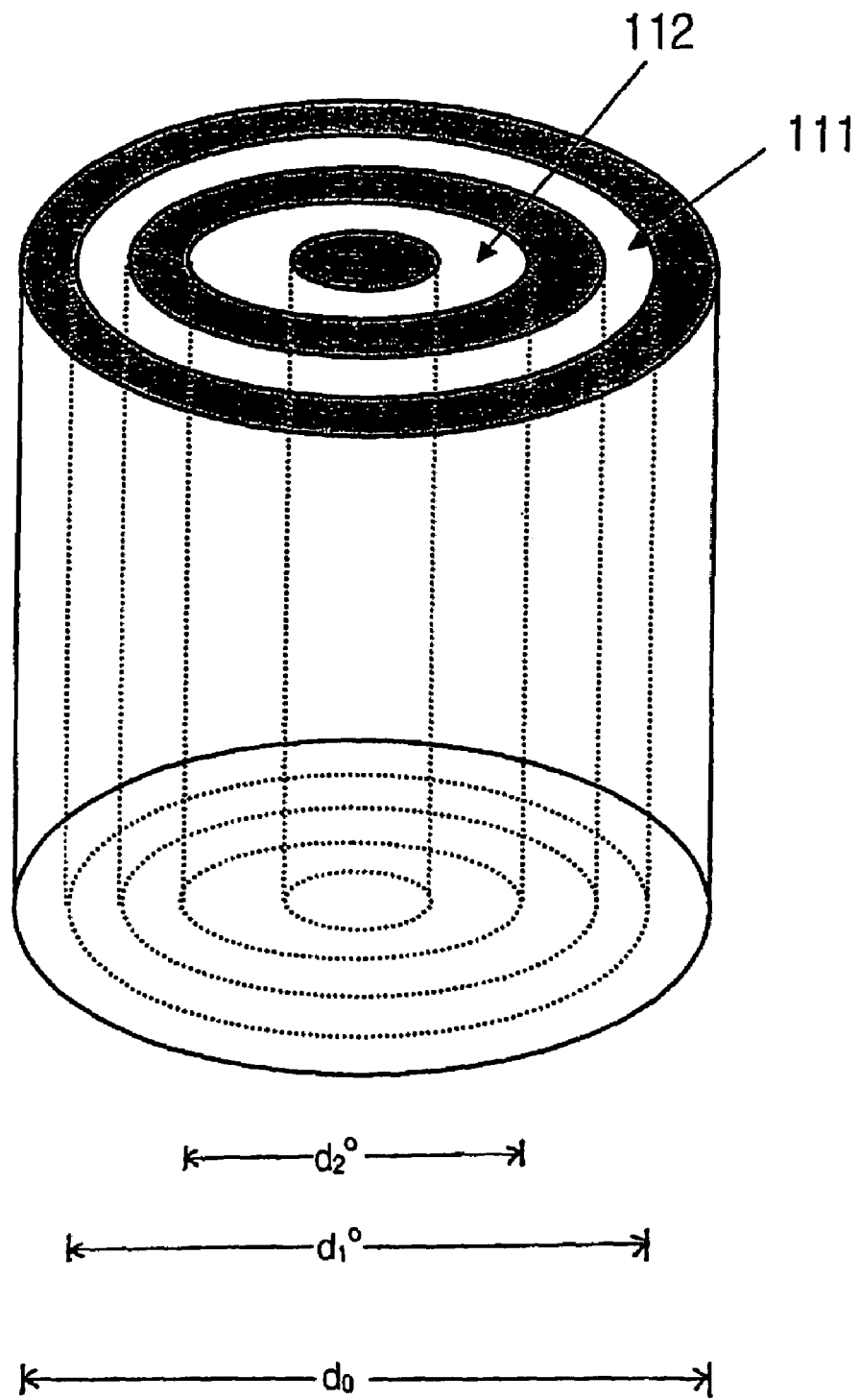
FIG. 1 is a schematic perspective view showing the structure of a plastic optical fiber preform obtainable by the present invention.

FIG. 1 is a schematic perspective view of a plastic optical fiber preform obtainable by the present invention. In accordance with the present invention, a GI plastic optical fiber preform having a radial refractive index gradient, which increases gradually from the outer periphery of the preform toward the center thereof, can be prepared by inserting a 1st plastic tube(inside diameter: $d_1^i$, outside diameter: $d_1^o$)(111) made of a first polymer(refractive index: $n_1$) in a cylindric polymerization reactor(inside diameter: $d_0^i$, $d_1^o \leq d_0^i$) and inserting a 2nd plastic tube(inside diameter: $d_2^i$, outside diameter: $d_2^o$, $d_2^o \leq d_1^i$)(112) made of a second polymer (refractive index: $n_2$, $n_2 > n_1$) in the 1st plastic tube, wherein the reactor, the 1st and 2nd plastic tubes are coaxially positioned; injecting a precursor of a third polymer(refractive index: n', n'>$n_2$) into the inner side of the 2nd plastic tube, injecting a precursor of a fourth polymer(refractive index: n", $n_1$<n"<$n_2$) into the space forward between the 1st and 2nd plastic tubes; and polymerizing and curing the precursors to form a core of the preform.

In accordance with the present invention, a plastic optical fiber preform is obtained by injecting one or more polymer precursors having intermediate refractive index values of two or more plastic tubes in the spaces formed between coaxially positioned plastic tubes and the reactor; swelling of the plastic tubes by the diffusion of the precursors thereinto; and simultaneously polymerizing precursors. In the inventive process, it is possible to control the refractive index distribution by properly selecting the plastic tubes with different refractive index and controlling the swelling time.

Rotation of the plastic tubes and glass tube can reduce the time for the swelling of the plastic tubes by the diffusion of precursor, which allows easy control of the refractive index gradient of the preform. The precursors are preferably introduced into the intermediate spaces generated by the centrifugal force from rotating of the plastic tubes.

The precursor used in this invention can be a monomer used in a conventional plastic optical fiber production, and a precursor having a high transparency, good process-ability and high heat resistance is preferred. The precursor is selected to give an acrylic resin, vinyl resin, polycarbonate resin, or ring-opened polymerizable resin or a mixture thereof, and the precursor may be optionally substituted with fluorine(F) or heavy hydrogen(D). Representative examples of the precursor include methylmethacrylate, benzylmethacrylate, phenylmethacrylate, 1-methylcyclohexylmethacrylate, cyclohexylmethacrylate, chlorobenzylmethacrylate, 1-phenylethylmethacrylate, 1,2-diphenylethylmethacrylate, diphenylmethylmethacrylate, 1-phenylcyclohexylmethacrylate, pentabromophenylmethacrylate, styrene, 2,2,2-trifluoroethylmethacrylate, 2,2,3,3,3-pentafluoropropylmethacrylate, 1,1,1,3,3,3-hexafluoroisopropylmethacrylate, 2,2,3,3,4,4,4-heptafluorobutylmethacrylate and a mixture thereof.

In addition, the prepolymer precursor may be an oligomer, prepolymer of said monomer, or prepolymer of co-monomer. For example, the prepolymer of co-monomer may be selected from the group consisting of methylmethacrylate-benzylmethacrylate copolymer, styrene-acrylonitrile copolymer, methylmethacrylate-2,2,2-trifluoroethylmethacrylate copolymer, methylmethacrylate-2,2,3,3,3-pentafluoropropylmethacrylate copolymer, methylmethacrylate-1,1,1,3,3,3-hexa fluoroisopropylmethacrylate copolymer, methylmethacrylate-2,2,3,3,4,4,4-heptafluorobutylmethacrylate copolymer and a mixture thereof.

In the present invention, the precursor may further contain a refractive index controller in an amount of 10 to 30% by weight based on the total weight of the precursor materials. The refractive index controller is selected from the group consisting of benzyl-n-butyl phthalate, benzylbenzoate, bromobenzene, diphenylsulfate, triphenylphosphate, diphenylphthalate, diphenylsulfoxide and a mixture thereof.

Also, a conventional reaction initiator or chain transferring agent may be added to the precursor in an amount of 0.1 to 10% by weight based on the total weight of precursor materials. The reaction initiator may be benzoyl peroxide, azobis-isobutyronitrile, butylperoxide and the like, and the chain transferring agent may be n-dodecyl mercaptan, n-butyl mercaptan, n-heptyl mercaptan and the like.

The polymerization of the precursor can be carried out by heating at 60 to 90° C. or by irradiating UV or electron beam thereon. Further, before the polymerization step, an aging step is preferably carried out at an ambient temperature to allow swelling of the plastic tubes by the precursor materials, which makes it possible to carry out the polymerization and curing at a relatively high temperature.

The polymerization reactor used in the inventive process is preferably made of glass or quartz.

In the present invention, a 3rd plastic tube made of a 3rd polymer having a refractive index of $n_3$($n_3$>$n_2$) and having an outer diameter of $d_3^o$($d_3^o$<$d_2^i$) may be inserted coaxially inside the 2nd plastic tube. In this case, a precursor having a refractive index of n'''(n'''>$n_3$) is introduced into the inner space of the 3rd plastic tube and polymerized and cured to obtain a preform for a GI type plastic optical fiber.

Figure 2A:
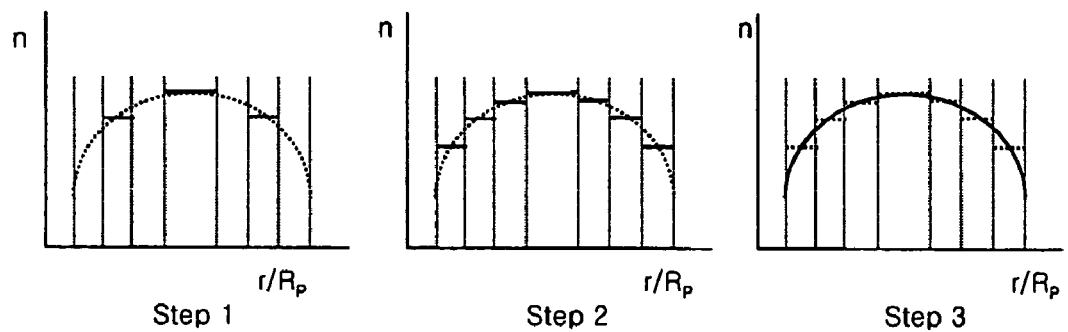
FIG. 2A shows the refractive index distribution of the preform shown in FIG. 1.
Figure 2B:
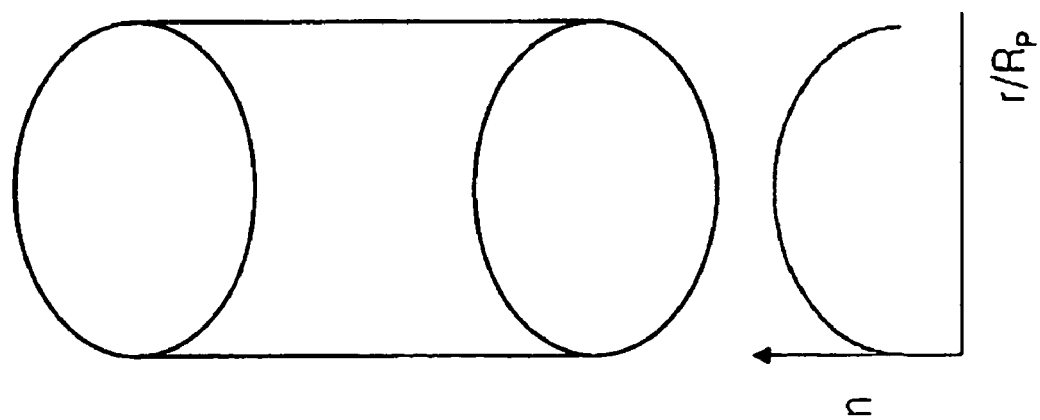
FIG. 2B is another illustration of the radial refractive index distribution of the preform shown in FIG. 1.

The method of this invention may provide a preform for a GI type plastic optical fiber, which has a gradually increasing refractive index gradient toward the center. FIG. 2A shows a radial refractive index distribution of the preform shown in FIG. 1, and FIG. 2B, another representation of the refractive index distribution of the preform shown in FIG. 1. As shown in the FIGS. 2A and 2B, the refractive index of the plastic optical fiber becomes lower as it goes from the center to the outer side of the preform.

The difference in the refractive index between the center and outermost side of the preform can be precisely controlled and such a difference is preferably in the range of 0.01 to 0.03.

Figure 3A:
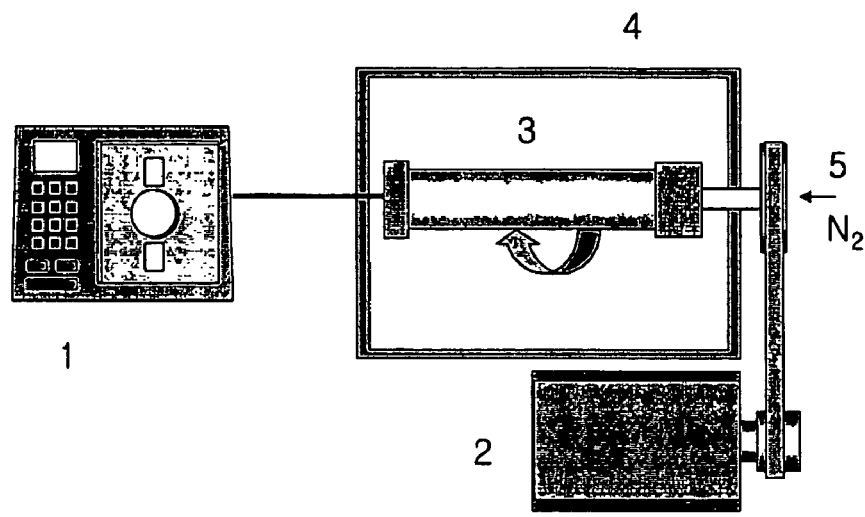
FIG. 3A and FIG. 3B are schematic perspective views of alternative apparatuses for producing plastic tubes used in the present invention.
Figure 3B:
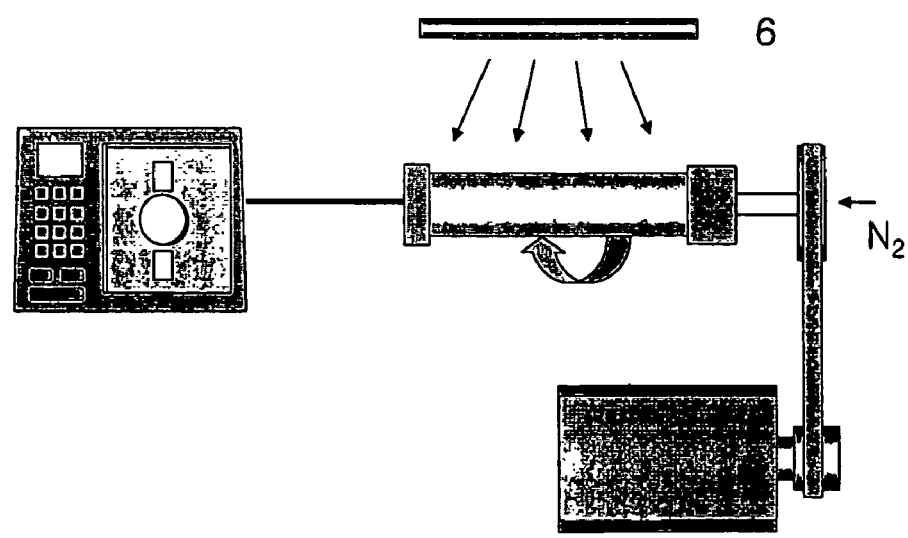

FIGS. 3A and 3B are schematic perspective views showing an apparatus for producing plastic tubes used in the present invention. The apparatus shown in FIG. 3A comprises a tube(3) for producing a plastic tube used in the present invention and a motor(2) to rotate the tube(3) at a high speed, the tube(3) being placed in a thermostat(4) for keeping a constant temperature during the polymerization process. The apparatus shown in FIG. 3A has an apparatus (6) for irradiating ultraviolet or electron beams. Furthermore, an inert gas(5) such as nitrogen may be introduced during the production of the plastic tube in order to prevent side reactions. The polymerization of precursors for the production of the plastic tubes can be carried out by heating at a temperature in the range of 30 to 60° C. or irradiating with ultraviolet or electron beams.

There is no limitation in terms of the material or size of the tube(3), as long as the tube is applicable for producing a plastic optical fiber, does not dissolve in the monomers used in the polymerization, and has a good heat stability at the polymerization temperature. It is preferred that the tube(3) is made of glass or a metal, has a diameter in the range of 1 to 100 cm and a length in the range of 15 cm to several meters. The rotation speed of the tube(3) is preferably in the range of 3,000 to 12,000 rpm. Further, a syringe pump or liquid pump(1) may be used to fine control the injection volume of the precursor.

It is preferred that the precursors used for producing the plastic tubes are of the same kind as the precursors injected between the plastic tubes for producing a preform for a plastic optical fiber.

A bigger-sized preform for a GI type plastic optical fiber may also be produced by replacing the innermost plastic tube with a plastic rod, which should have a higher refractive index than that of the adjacent plastic tube, so that the preform obtained has a gradually increasing refractive index gradient toward the center.

Furthermore, in the present invention, the plastic rod may be a preform for a GI type plastic optical fiber prepared by the inventive process, thus facilitating the production of a preform for a GI type plastic optical fiber having a large diameter.

Figure 4:
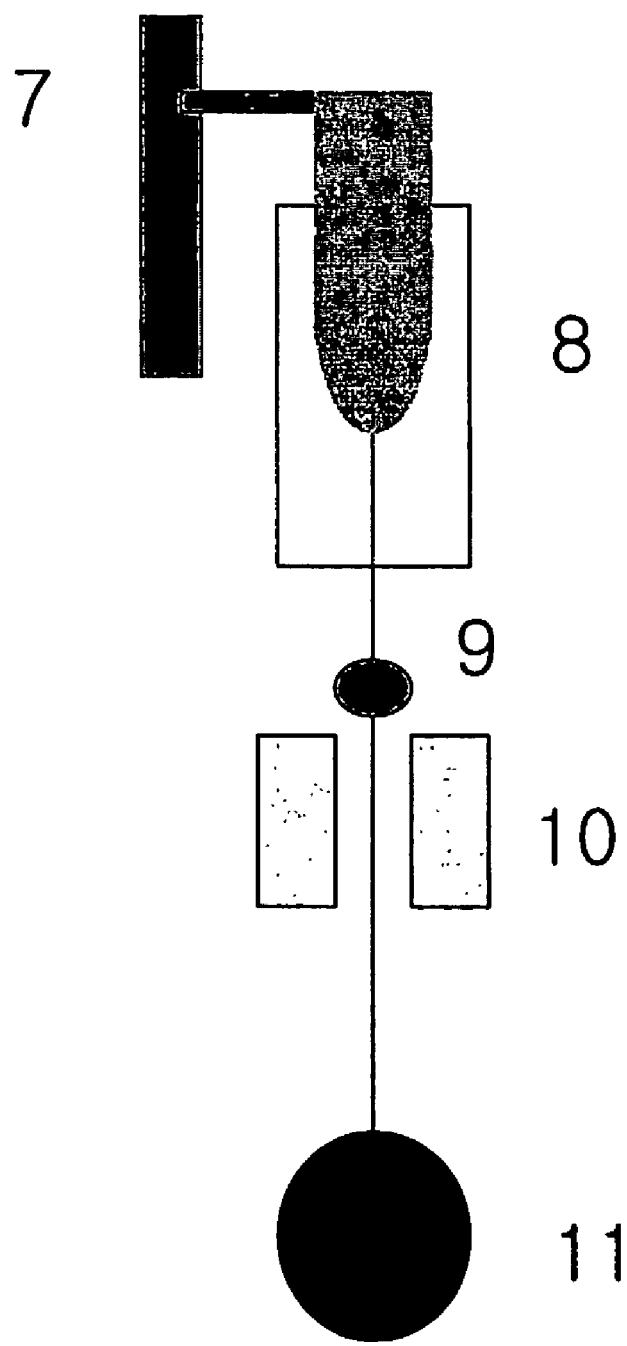
FIG. 4 is a schematic perspective view showing an apparatus for processing the optical fiber preform prepared by the present invention.

The preform prepared by the inventive process may be processed using an apparatus shown in FIG. 4 to produce an optical fiber. As shown in FIG. 4, the preform is fed from a preform feeder(7) to a preform heating device(8) to be melted and drawn, and then the drawn preform can be coated with a cladding by a clad coating device(9), cured through an ultraviolet irradiator(10) and drawn in the longitudinal direction, providing a finished plastic optical fiber. The optical fiber thus obtained preferably has a diameter of less than 1 mm. The diameter of the optical fiber can be controlled by adjusting the feeding rate of the preform and the drawing speed of the fiber. The drawing speed of the fiber can be controlled with a PID(proportional-integral-derivative) controller while the diameter of the fiber is measured with a diameter gauge.

Hereinbelow, the present invention will be described in further detail by the following Examples, which are, however, not intended to limit the scopes of the present invention.

Production of Plastic Tube

PREPARATIVE EXAMPLE 1-1

Referring to the apparatus shown in FIG. 3A, a glass tube(3) having an inner diameter of 4.5 cm and a length of 50 cm was rotated at 5,000 rpm in a convection oven maintained at 60° C., and introduced thereto using a liquid pump was a polymer precursor composition comprising a monomeric mixture composed of 85 wt. % methyl methacrylate and 15 wt. % benzyl methacrylate, 0.2 wt. % of benzoyl peroxide, and 0.2 wt. % n-dodecyl mercaptan based on the total weight of the monomeric mixture in an amount that would give a thickness of 0.5 cm. The precursor composition fed to the tube(3) had a refractive index of 1.43 and it was cured for 3 hours, to obtain a plastic tube having an outer diameter of 4.5 cm, a thickness of 0.5 cm and a refractive index of 1.51.

PREPARATIVE EXAMPLE 1-2

The procedure of Preparative Example 1-1 was repeated except for using a glass tube having an inner diameter of 3 cm and a length of 50 cm, and a precursor composition comprising a monomeric mixture composed of 75 wt. % methyl methacrylate and 25 wt. % benzyl methacrylate. The precursor composition had a refractive index of 1.44. A plastic tube having an outer diameter 3 cm, a thickness of 0.5 cm and a refractive index of 1.52 was obtained.

PREPARATIVE EXAMPLE 2-1

The procedure of Preparative Example 1-1 was repeated except that a precursor mixture composed of 90 wt. % methyl methacrylate and 10 wt. % bromobenzene was employed. A plastic tube having an outer diameter of 4.5 cm, a thickness of 0.5 cm and a refractive index of 1.50 was obtained.

PREPARATIVE EXAMPLE 2-2

The procedure of Preparative Example. 1-2 was repeated except that a precursor mixture composed of 80 wt. % methyl methacrylate and 20 wt. % bromobenzene was employed. A plastic tube having an outer diameter 3 cm, a thickness of 0.5 cm and a refractive index of 1.51 was obtained.

PREPARATIVE EXAMPLE 3-1

The procedure of Preparative Example 1-1 was repeated except that a precursor mixture composed of 85 wt. % methyl methacrylate and 15 wt. % benzylmethacrylate was dissolved in THF(five-fold volume), the resulting precursor solution was prepolymerized, and the solvent was evaporated under a vacuum. A plastic tube having an outer diameter 3 cm, a thickness of 0.5 cm and a refractive index of 1.51 was obtained.

PREPARATIVE EXAMPLE 3-2

The procedure of Preparative Example 1-2 was repeated except that a precursor mixture composed of 75 wt. % methyl methacrylate and 25 wt. % benzyl methacrylate was dissolved in THF(five fold volume), the resulting precursor solution was prepolymerized, and the solvent was evaporated under a vacuum. A plastic tube having an outer diameter 3 cm, a thickness of 0.5 cm and a refractive index of 1.52 was obtained.

PREPARATIVE EXAMPLE 4-1

The procedure of Preparative Example 1-1 was repeated except that a precursor mixture composed of 85 wt. % methyl methacrylate and 15 wt. % benzyl methacrylate was dispersed in distilled water(six fold volume) using a dispersant in an amount of 1 to 2 wt. % based on the total weight of the precursor suspension. The suspension was subjected to prepolymerization, the prepolymer thus obtained was rinsed with distilled water, and water was removed under a vacuum. A plastic tube having an outer diameter 4.5 cm, a thickness of 0.5 cm and a refractive index of 1.51 was obtained.

Procedure 4-2

The procedure of Preparative Example 1-2 was repeated except that a precursor mixture composed of 75 wt. % methyl metacrylate and 25 wt. % benzyl metacrylate was suspended in distilled water(six fold volume) using a dispersant in an amount of 1 to 2 wt. % based on the total weight of the precursor suspension. The precursor suspension was prepolymerized, the prepolymer thus obtained was rinsed with distilled water, and water was removed under a vacuum. A plastic tube having an outer diameter 3 cm, a thickness of 0.5 cm and a refractive index of 1.52 was obtained.

Production of Plastic Preform

EXAMPLE 1

Methyl methacrylate and benzyl methacrylate were mixed to prepare three mixtures having mixing ratios of 90:10, 80:20 and 75:25 respectively, and 0.2 wt. % of benzoyl peroxide and 0.2 wt. % of n-dodecyl mercaptan were added to each mixture to obtain three monomeric compositions having refractive indices of 1.429(No. 1), 1.438(No. 2) and 1.447(No. 3), respectively.

The plastic tube obtained in Preparative Example 1-1 was inserted coaxially in a glass tube(inner diameter: 5 cm) of a polymerization reactor, and then inserted coaxially thereinto was the plastic tube obtained in Preparative Example 1-2

(plastic tube 1-2). Subsequently, the monomeric composition No. 1 was injected in the space between the glass reactor and the plastic tube (1-1); the monomeric composition No. 2 in the space between the plastic tube (1-1) and (1-2); and the monomeric composition No. 3 in the center of the plastic tube (1-2).

After 1 hr, the compositions were polymerized by heating in an oven at 60° C. for 12 hrs, and dried at 120° C. for 24 hrs, to obtain a preform for a plastic optical fiber having a refractive index gradient which decreases gradually from the center to the outer periphery thereof. The resultant preform had a refractive index of 1.52 at the center and 1.50 at the outermost side, and it had a refractive index pattern similar to that shown in FIG. 2A.

EXAMPLE 2

Methyl metacrylate and bromobenzene were mixed to prepare three mixtures having mixing ratios of 95:5, 85:15 and 75:25 respectively, and 0.2 wt. % of benzoyl peroxide and 0.2 wt. % of n-dodecyl mercaptan were added to each mixture to obtain three monomeric compositions having refractive indices 1.427(No. 1), 1.441(No. 2) and 1.455(No. 3) respectively.

The plastic tube obtained in Preparative Example 2-1 was inserted coaxially in a glass tube(inner diameter: 5 cm) of a polymerization reactor, and then inserted coaxially thereinto was the plastic tube obtained in Preparative Example 2-2 (plastic tube 2-2). Subsequently, the monomeric composition No. 1 was injected in the space between the glass reactor and the plastic tube (2-1); the monomeric composition No. 2 in the space between the plastic tube (2-1) and (2-2); and the monomeric composition No. 3 in the center of the plastic tube (2-2).

The other conditions are the same as in Example 1. The resultant preform had a refractive index of 1.51 at the center and 1.49 at the outermost side, and it had a refractive index distribution pattern similar to that shown in FIG. 2A.

EXAMPLE 3

The procedure of Example 1 was repeated except that plastic tubes obtained in Preparative Example 3-1 and 3-2 were used. The obtained preform had a refractive index of 1.53 at the center and 1.51 at the outermost side, and it had a refractive index distribution pattern similar to that shown in FIG. 2A.

EXAMPLE 4

The procedure of Example 1 was repeated except that plastic tubes obtained in Preparative Example 4-1 and 4-2 were used. The obtained preform had a refractive index of 1.52 at the center and 1.50 at the outermost side, and it had a refractive index distribution pattern similar to that shown in FIG. 2A.

Production of Optical Fiber

EXAMPLE 5

Referring to the apparatus shown in FIG. 4, the preform prepared in Example 1 was fed at a rate of 5 mm/min to a heating device(8) maintained at 250° C. and drawn. The drawn preform was coated with a polymer composition having a refractive index of 1.45 in a clad coating device, and cured using an ultraviolet irradiation device(10) to obtain an optical fiber of 1,000 µm in diameter.

According to the present invention, a preform for a GI type plastic optical fiber having a desired refractive index distribution pattern can be prepared easily without any size limitation by way of injecting pre-designed polymer precursors in the spaces formed between two or more plastic tubes having different refractive indices and diameters, and polymerizing and curing the precursors, and drawing the resultant preform.

What is claimed is:

1. A process for producing a preform for a plastic optical fiber having a refractive index distribution which gradually increases from the outer periphery toward the center thereof, comprising inserting a $1^{st}$ plastic tube (inside diameter: $d_1^i$, outside diameter: $d_1^o$) made of a first polymer (refractive index: $n_1$) in a cylindric polymerization reactor (inside diameter: $d_0$, $d_1^o \leq d_0$) and inserting a $2^{nd}$ plastic tube (inside diameter: $d_2^i$, outside diameter: $d_2^o$, $d_2^o \leq d_1^i$) made of a second polymer (refractive index: $n_2$, $n_2 > n_1$) into the $1^{st}$ plastic tube, wherein the reactor, the $1^{st}$ and $2^{nd}$ plastic tubes are coaxially positioned; injecting a precursor of a third polymer (refractive index: n', n'>$n_2$) into the inner side of the $2^{nd}$ plastic tube and a precursor of a fourth polymer (refractive index: n'', $n_1$<n''<$n_2$) into the space formed between the $1^{st}$ and $2^{nd}$ plastic tubes; and polymerizing and curing the precursors to form a core of the perform.

2. The process according to claim 1, wherein a $3^{rd}$ plastic tube made of a third polymer having a refractive index of $n_3(n_3>n_2)$ and outside diameter of $d_3^o(d_3^o<d_2^i)$ is inserted in the center of the $2^{nd}$ plastic tube in a coaxial manner.

3. The process according to claim 1, wherein the polymerization is performed while the plastic tubes are rotated in the polymerization reactor.

4. The process according to claim 3, wherein the precursor is introduced into the space generated by the centrifugal force of the rotation of the plastic tubes.

5. The process according to claim 1, wherein the plastic tubes are made of the same materials as those of the precursors.

6. The process according to claim 1, wherein the polymerization is carried out by heating at a temperature in the range of 60 to 90° C., or by irradiating with ultraviolet ray or electron beam.

7. The process according to claim 1, wherein the precursor is a monomer or a prepolymer that can be polymerized to give an acrylic resin, vinyl resin, polycarbonate resin, ring-opened polymerizable resin or a mixture thereof, the monomer or prepolymer being optionally substituted with fluorine or heavy hydrogen.

8. The process according to claim 7, wherein the monomer is selected from the group of methylmethacrylate, benzylmethacrylate, phenylmethacrylate, 1-methylcyclohexylmethacrylate, cyclohexylmethacrylate, chlorobenzylmethacrylate, 1-phenylethylmethacrylate, 1,2-diphenylethylmethacrylate, diphenylmethylmethacrylate, 1-phenylcyclohexylmethacrylate, pentabromophenylmethacrylate, styrene, 2,2,2-trifluoroethylmethacrylate, 2,2,3,3,3-pentafluoropropylmethacrylate, 1,1,1,3,3,3-hexafluoroisopropylmethacrylate, 2,2,3,3,4,4,4-heptafluorobutylmethacrylate and a mixture thereof.

9. The process according to claim 7, wherein the prepolymer is selected from the group consisting of methymethacrylate-benzylmethacrylate copolymer, styrene-acrylonitrile copolymer, methylmethacrylate-2,2,2-trifluoroethylmethacrylate copolymer, methylmethacrylate-2,2,3,3,3-pentafluoropropylmethacrylate copolymer, methylmethacrylate-1,1,1,3,3,3-hexa fluoroisopropylmethacrylate copolymer, methylmethacrylate-2,2,3,3,4,4,4-heptafluorobutylmethacrylate copolymer and a mixture thereof.

10. The process according to claim 1, wherein the precursor further contains a refractive index controller selected from the group consisting of benzyl n-butyl phthalate, benzylbenzoate, bromobenzene, diphenylsulfate, triphenylphosphate, diphenylphthalate, diphenylsulfoxide and a mixture thereof.

11. The process according to claim 1, wherein the polymerization reactor is made of glass or quartz.

12. The process according to claim 1, which further comprises inserting a plastic rod having a higher refractive index than that of the second plastic tube.

13. The process according to claim 12, wherein the plastic rod has a refractive index gradient which increases gradually from the outer periphery of the rod toward the center thereof.

14. The process according to claim 12, wherein the plastic rod is a preform of a GI type plastic optical fiber prepared by the process according to claim 1.

15. A GI type plastic optical fiber preform prepared by the process according to claim 1.

16. A plastic optical fiber prepared by drawing the plastic preform of claim 15 and coating thereon a clad which has a lower refractive index than that of the outer periphery of the preform.

17. A GI type plastic optical fiber preform prepared by the process according to claim 2.

18. A GI type plastic optical fiber preform prepared by the process according to claim 3.

19. A GI type plastic optical fiber preform prepared by the process according to claim 4.

20. A GI type plastic optical fiber preform prepared by the process according to claim 5.

21. A GI type plastic optical fiber preform prepared by the process according to claim 6.

22. A GI type plastic optical fiber preform prepared by the process according to claim 7.

23. A GI type plastic optical fiber preform prepared by the process according to claim 8.

24. A GI type plastic optical fiber preform prepared by the process according to claim 9.

25. A GI type plastic optical fiber preform prepared by the process according to claim 10.

26. A GI type plastic optical fiber preform prepared by the process according to claim 11.

27. A GI type plastic optical fiber preform prepared by the process according to claim 12.

28. A GI type plastic optical fiber preform prepared by the process according to claim 13.

29. A GI type plastic optical fiber preform prepared by the process according to claim 14.

* * * * *